April 16, 1963  C. G. KAEHMS  3,086,108
INFRARED HOTBOX DETECTION SYSTEM
Filed March 22, 1960  4 Sheets-Sheet 1

Inventor
Charles G. Kaehms.
By Mann, Brown and McWilliams
Attys.

April 16, 1963 C. G. KAEHMS 3,086,108
INFRARED HOTBOX DETECTION SYSTEM
Filed March 22, 1960 4 Sheets-Sheet 2

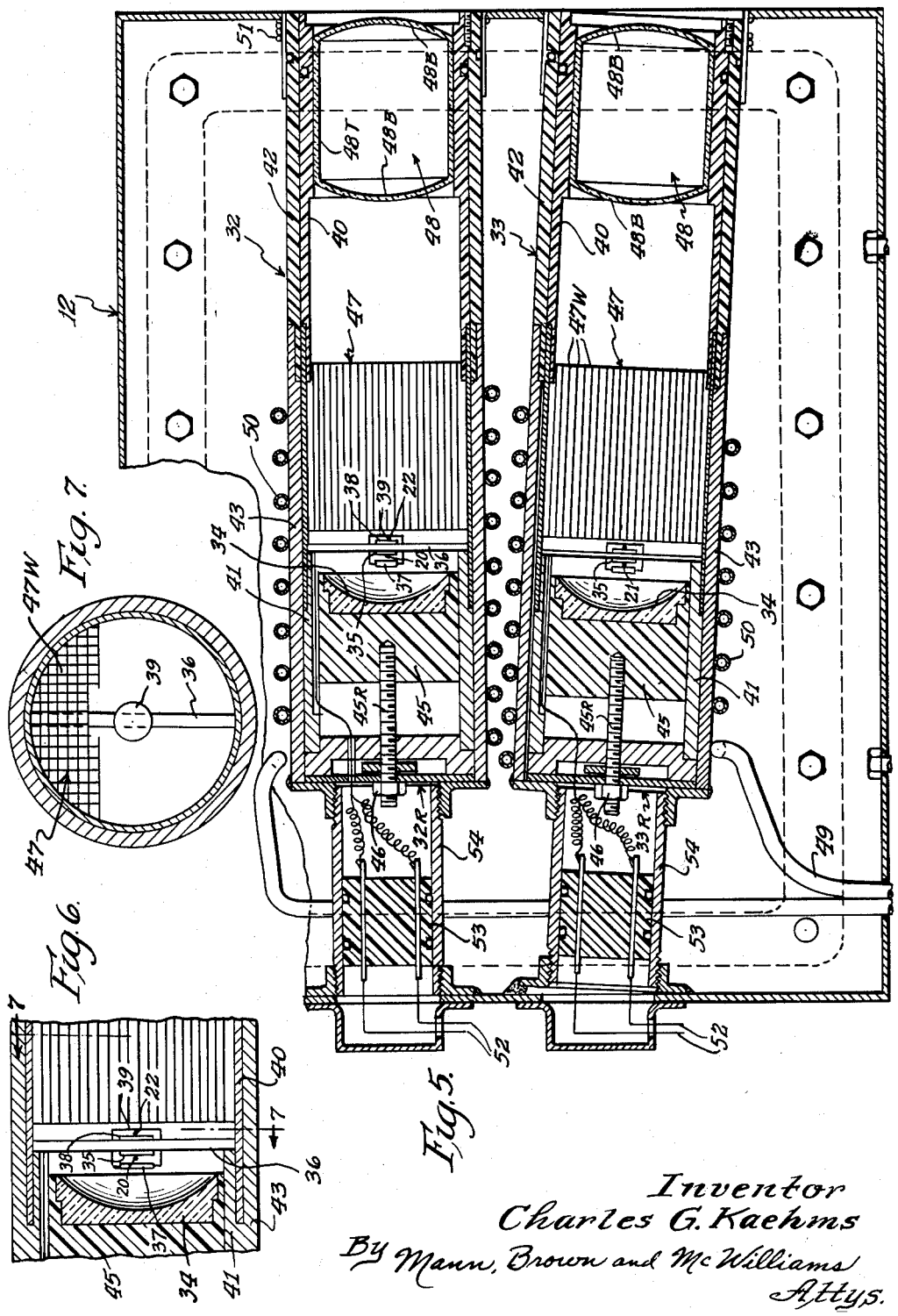

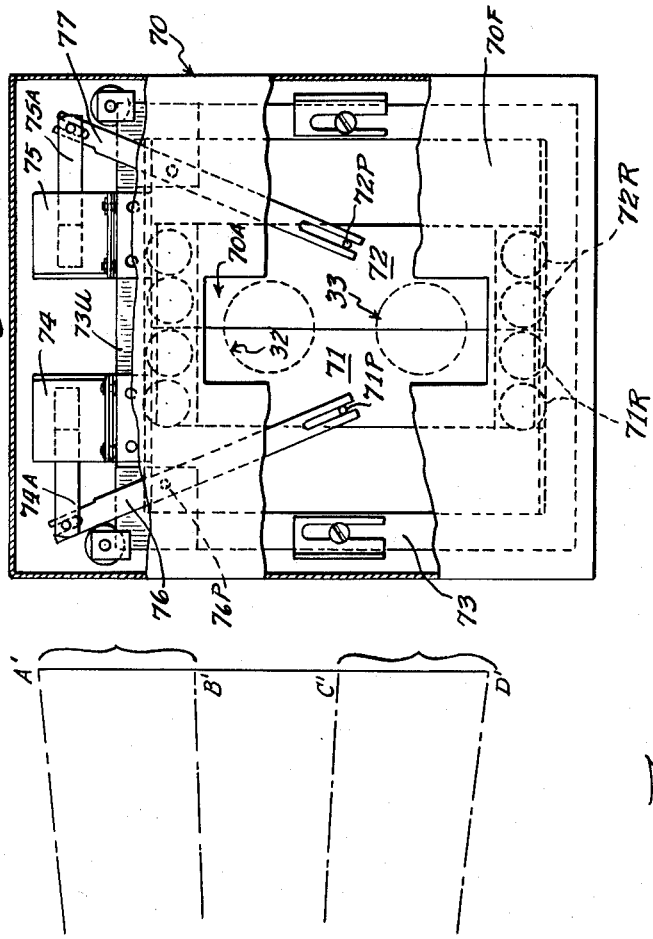

United States Patent Office 3,086,108
Patented Apr. 16, 1963

3,086,108
INFRARED HOTBOX DETECTION SYSTEM
Charles G. Kaehms, 65 Market St., San Francisco 5, Calif.
Filed Mar. 22, 1960, Ser. No. 16,876
7 Claims. (Cl. 246—169)

This invention relates to an infrared detection system and components therefor and, more particularly, is concerned with a system and components useful in the detection of overheated journal boxes on railroad cars.

Infrared systems for application to the detection of overheated journal boxes have already proven the merit of this approach, but there are numerous technical problems arising from field application of the units which cause operational error and false indications.

For example, infrared energy from the sun shining on the car surface under inspection can actuate the infrared detector and cause false indications, and this has proven to be one of the most difficult problems to eliminate. The problem is most severe when the sun is oriented to reflect directly into the detector, but it is troublesome even if the sun merely shines on or lights up the surface under inspection.

Changes in ambient temperature have a significant effect on the temperature of the journal box and must be continuously compensated if infrared detector elements are to give a reliable measurement of the extent of overheating of the journal box. Temperature changes also markedly affect the response sensitivity and range of lead sulfide or lead selenide detector cells and to a lesser, but noticeable, extent, they affect thermistor or indium antimonide detector elements.

Another specific source of false operation is found in cars equipped with roller bearings. The journal boxes on cars equipped with roller bearings normally run at substantially higher temperatures than do journal boxes for cars equipped with conventional solid journal bearings.

The principal object of the present invention is the provision of an improved infrared-sensitive system for detecting overheated journal boxes, with the system being substantially unaffected by sunlight reflection, ambient temperature variations, and the higher operating temperatures of roller bearing equipped journal boxes.

Another object of the invention is the provision of an improved infrared detection system of economical construction and having simplified control facilities that prepare the system for operation upon the approach of a train, that gate the infrared detector circuit in synchronism with the passage of each journal box through the field of view of the detector, and that signal the presence of a hotbox condition.

Still another object of the invention is the provision of an improved infrared detection system having a balanced arrangement of infrared detector elements for automatically compensating unpredictable factors such as background radiation and ambient temperature variations.

Another object of the invention is the provision of an infrared detector construction having an efficient, low-cost optical system.

Experience has shown that dangerous hot journal box conditions may develop within a relatively short space of time and therefore systems of detection depending only upon the placement of detector stations at key points such as classification yards do not give adequate coverage of the rail system. In the present state of the art, elaborate electronic detection, indication, recording and signaling equipment has been employed with infrared detection systems, but the cost of installations of this type is prohibitive if wide distribution throughout the system is to be made. One of the features of the present invention is its adaptability to low-cost detection arrangements, and in this connection, for indication it contemplates notifying the train personnel of the hotbox condition so that they may immediately remedy the problem.

Briefly, in its application to the detection of overheated railway car journals, the invention employs a pair of infrared detector elements optically oriented to image on vertically spaced regions on a journal box wall. The higher region of the journal box wall, being closer to the journal brass along a heat-conducting path, is at a higher temperature than the lower region of the journal box wall. Electrically, the infrared detector elements are connected to act in opposition so that sun shining on the box wall, ambient temperature variations on the wall, and similar uncontrollable external factors normally produce effects on the upper and lower regions of the wall that balance out.

The response circuitry for the balanced detectors is adjusted to accommodate a predetermined range in the temperature differential between the upper and lower regions of the journal box before responding to trigger an indicator. This temperature differential increases proportionally with the increase in the temperature of the journal bearing over ambient unitil it exceeds a preselected value indicative of an unacceptably high temperature at the journal brass at which point an indicator is actuated.

A further object of the invention is the provision of a novel temperature-controlled, refrigerated mounting cabinet for infrared detector elements.

Still a further object of the invention is the provision of a mounting cabinet arrangement having a balanced pair of detectors and the provision of a divided shutter plate arrangement normally masking the detectors and separable to expose the detectors in a balanced fashion, thus preventing imbalances that lead to false operation.

Other objects and advantages will become apparent during the course of the following description.

In the accompanying drawings forming a part of this specification and in which like numerals are employed to designate like parts throughout the same:

FIG. 3 is a simplified perspective view further illustrating the optical orientation of the infrared detection elements and their image areas on the journal boxes;

FIG. 4 is a wiring diagram of a sensing and control circuit arrangement incorporating the infrared detector elements in balanced opposition;

FIG. 5 is a vertical sectional view through the length of the mounting cabinet for the infrared detector elements and illustrating the construction of the detector mounting tubes;

FIGS. 6 and 7 are fragmentary side and face views, respectively, better illustrating the details of the mounting location and optical arrangement of one of the detector elements;

FIG. 8 is a diagrammatic side-elevational view illustrating a split beam double-detector optical system for use in the system of this invention;

FIG. 9 is an enlarged fragmentary side-elevational view through the split beam pickup tube of FIG. 8; and FIG. 10 is a front elevational view of the shutter-mounting arrangement, with parts of the shutter housing wall broken away and sectioned to better illustrate the actuating components for the shutter plates.

General Arrangement

Figure 1:
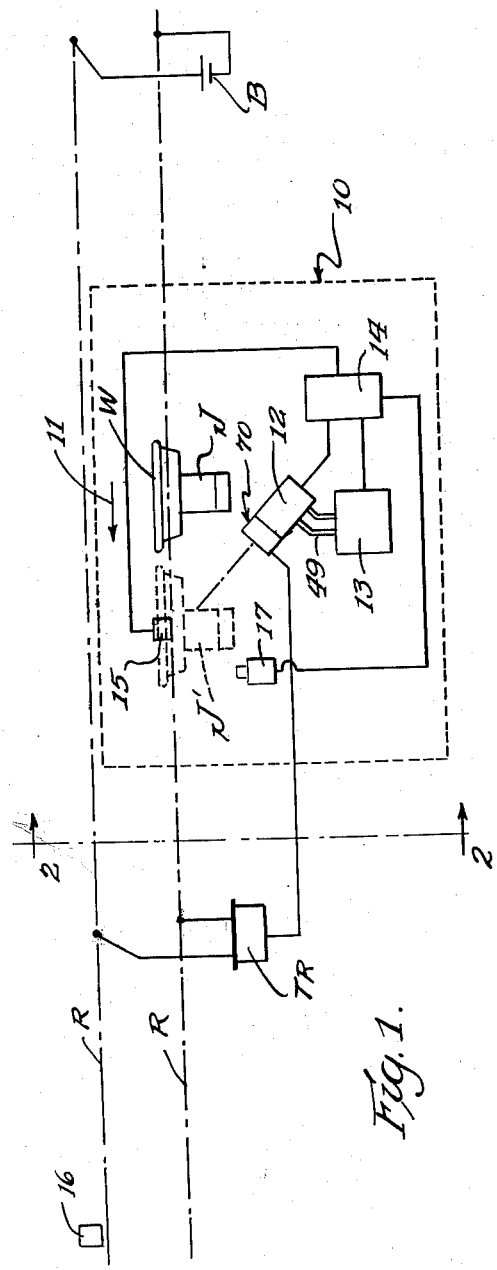
FIG. 1 is a diagrammatic plan view illustrating the general physical layout and interconnection of the infrared detection system equipment of this invention in its application to the detection of hot journal boxes.
Figure 2:
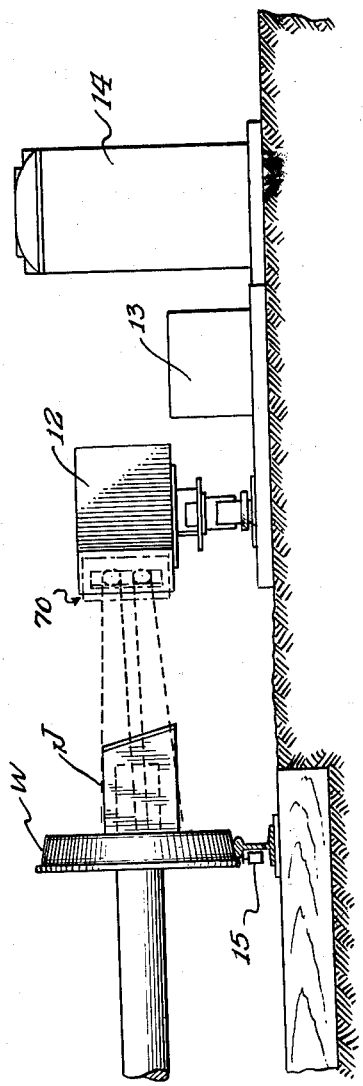
FIG. 2 is an elevational view better illustrating the mounting relationship of the infrared detection apparatus with respect to the track rails.

For purposes of disclosure, the infrared detection system is shown in FIGS. 1, 2 and 3 in its application to the detection and indication of overheated journal boxes on railroad cars. The detector station is indicated generally at 10 in FIG. 1 and is shown located along a section of track that is provided with a conventional track circuit extending in opposite directions from the detector station and including the usual battery B and track relay TR. One of the train wheels W and its associated journal box J are represented moving along the track rails R in the direction indicated by the arrow 11.

At the detector station 10, the infrared detection elements are housed within a mounting cabinet 12 and are optically oriented to image the radiation emanating from the rearmost lateral wall of the journal box as it moves through the test point, indicated in dotted lines at J' in FIG. 1. The detector cabinet is thermally insulated and is cooled by a refrigeration unit 13 to maintain a stable temperature condition in the cabinet 12. A separate cabinet 14 contains the control circuits for the infrared detectors.

The track relay TR controlled by the track circuit is connected to operating solenoids for a mechanical shutter mechanism mounted across the front of the detector element cabinet 12 for maintaining the infrared detecting elements in a dark condition and for protecting the glass lenses of the mounting tubes that house the detector elements. The shutter mechanism is normally held closed by the energized track relay and it opens only during the approach and passage of a train.

Accordingly, the track circuit may extend one hundred feet along the approach side of the detector station and seventeen feet along the departure side of the detector station. The first truck of an approaching train will shunt the track circuit and deenergize the track relay TR until the entire train has passed the detector station.

A wheel-sensing unit 15 is located at the test point and is connected to momentarily enable the output control circuits from the infrared detectors at the time that the rearmost lateral wall of each journal box is in the field of view of the detectors. A wheel-sensing unit for this purpose is disclosed in my copending application Serial No. 3,177, filed January 18, 1960, the disclosure of which, to the extent it is not inconsistent herewith, is hereby incorporated by reference.

When a hot journal box condition is detected, suitable indicating equipment is operated to alert the train personnel. Where the infrared detection system is to be installed at frequent intervals along a train route, it is preferred that the hotbox condition be indicated merely by operating a wayside signal 16 and a suitable paint-spray device 17 so that the wayside signal which is located one or two miles from the detector station will notify the train engineer of the hotbox condition and the train then may be stopped and immediately inspected by the train men, with the paint-spray marking on the defective box facilitating the inspection operation.

As best illustrated in FIGS. 2 and 3, in the preferred arrangement illustrated herein for purposes of disclosure, two detector elements are disposed in vertical alignment and are directed along vertically diverging lines to image at vertically spaced regions of the rearward lateral wall of the journal box. The detecting elements are located approximately at the elevation of the journal box and preferably slightly thereabove so that their optical lines of sight incline slightly downwardly in a direction extending towards the journal box for minimizing the possibility of encountering a relatively high-energy direct sunlight reflection pattern.

It has been determined that during normal train operation the upper regions of the journal box operate at a higher temperature than the lower regions and, in fact, the differential in temperature between the upper and lower regions of the journal box may reliably be related to the differential in temperature between ambient and the journal itself. This is understandable of solid journal bearing arrangements, since the heat is generated between the journal and journal brass; and since the journal brass is directly connected only to the top wall of the journal box, the temperature due to journal heating is always higher at the upper regions of the journal box walls than at the lower regions thereof. A measurement of the temperature differential on the journal box surface gives reliably accurate indication of overheating at the journal and forms the basis for the present infrared hotbox detection system.

It should be noted that many extraneous factors such as sun reflection and ambient temperature variations affect both the upper and lower regions of the journal box substantially equally and hence affect both detector elements substantially equally such that these factors balance out automatically and without the need of critically sensitive electronic sensing and correction circuits.

It is important to note that cars equipped with solid journal bearing arrangements have been substantially the only type subject to hotbox failures, whereas roller bearing equipped cars have been substantially free of hotbox failures. However, the journal boxes on roller bearing equipped cars normally operate at a higher temperature than do those equipped with properly lubricated solid journal bearings and in the past it has been a problem to discriminate between an overheated solid journal bearing and roller bearing equipped journal boxes. A number of elaborate and expensive techniques have been suggested for solving this problem. The present invention, however, makes use of the fact that the temperature differential on the journal box wall for a roller bearing equipped car is substantially different from that for the solid journal bearing equipped car. The present dual detector arrangement is set to respond only when the upper detector senses a substantially higher temperature than the lower detector, and hence, it inherently discriminates against the somewhat different temperature pattern on journal boxes equipped with roller bearings.

It is preferred to image the detectors substantially entirely on a vertical side wall of the journal box in order to best balance radiation energy of the sun reflecting from the journal box; however, in the present arrangement, the uppermost detector is imaged partially on the top wall of the journal box since this is the hottest region of the box. While it is recognized that temperature differentials may be selected between various other regions of the box, the rearward lateral wall of the box is the preferred target. This rearward wall is shielded from cooling air currents resulting from the train's motion and therefore operates at a somewhat higher temperature, and this gives increased sensitivity to the response of the detector elements. There is the further advantage that the detector elements, when imaged on the rearward wall, are facing in the general direction in which the train moves, and hence are shielded against mechanical damage from flying stones, dust, etc., stirred up by the train's motion.

Detector Circuit

One circuit arrangement which has been utilized in an experimental installation of the dual detector type infrared hot journal box detection system of this invention is shown in FIG. 4 wherein the detector elements for imaging on the upper and lower regions of the journal box are designated 20 and 21, respectively, and each is connected in a separate bridge circuit. Each bridge circuit includes a matching element 22 identical with the actual detector element and, by virtue of its mounting location, the matching element is exposed to the same environment with the exception that it is shielded from radiation. For example, if the detector element is to be a lead sulfide cell, then the corresponding element 22 would also be a lead sulfide cell of identical characteristic to provide a match. If a thermistor is utilized as the infrared detecting element, then a thermistor would be used for its matching element 22. When the arrangement is in a dark state, each of the elements 22 provides a substantial match for its corresponding infrared detecting element.

In the dark state condition, the voltage generated by the battery 23 in its loop circuit is balanced against the voltage generated by battery 24 in its loop circuit and the bridge circuit is adjusted so that the grid of amplifier tube 25 is normally maintained a few volts negative with respect to its cathode. Correspondingly, the bridge circuit for the infrared detector 21 has matched loops in which the voltage of battery 23 is balanced against the voltage of battery 24 and is adjusted so that a resultant small negative bias voltage is applied to the grid of amplifier tube 26. It will be noted that the grid-to-cathode circuit of amplifier tube 25 includes its associated bridge circuit and a portion of a resistor 27 which is also connected to the cathode of amplifier tube 26.

The output of amplifier tube 25 feeds an output control circuit which is shown as a stable two-stage high-gain transistor amplifier having a first-stage transistor 28 and a second-stage transistor 29.

A normally open contact 15C of relay 15R which is controlled by the wheel-sensing unit 15 normally disables the output control circuit. The control circuit is then activated momentarily for each passing wheel. A sensitive relay 30 is connected in the collector circuit of transistor 29 annd its contact 30C is connected to control a utilization circuit 31 that may actuate indicating equipment such as the wayside signal 16 and paint spray 17 of FIG. 1. If desired, the indicating equipment may comprise more sophisticated electronic gear for indicating and reporting information as to which wheel or wheels on the train have overheated journal boxes.

The bridge circuits are adjusted so that the journal boxes of the journals which are operating at normal temperature levels will not cause the circuit to operate relay 30. It will be apparent that even at normal running temperatures, a higher temperature is developed at the top of the journal box, which is imaged by detector 20, than at the bottom of the box, which is imaged by detector 21; and the amplifier circuits are biased to accommodate the normal range of temperature differential existing on journal boxes operating at acceptable efficiencies.

Thus the bias setting is sufficient to normally limit conduction through amplifier tube 25 but for journals operating at an overheated condition, the temperature differential on the journal box becomes great enough to override the bias on amplifier 25 and establish increased conduction therethrough for triggering relay 30 which controls actuation of the utilization circuit 31.

At normal operating conditions, it will be understood that infrared energy sensed by the detector 21 causes amplifier tube 26 to develop a voltage across its cathode resistor 27, which tends to make the grid of amplifier tube 25 slightly more negative and hence it tends to prevent conduction in tube 25. However, since the temperature sensed by detector 20 is appreciably greater than that sensed by detector 21, particularly for overheated journal conditions, the negative effect on tube 25 produced by detector 21 is relatively slight and does not prevent conduction through tube 25 when an overheated journal appears. It is also possible to select detecting elements which are more sensitive to the shorter wavelengths corresponding to the hotter temperature range existing at the top of the box. Lead sulfide or lead selenide detector elements have this favorable characteristic.

The balanced detector arrangement thus is uniquely sensitive to temperature differentials on the box. However, the compensating effects produced by the detecting elements 20 and 21 are substantially equal and therefore balance out when subjected to equal amounts of infrared energy such as occurs when sunlight is reflected from the journal box.

Due to sun reflection, detecting element 20 responds so as to drive the grid of tube 25 less negative. Correspondingly, detector element 21 responds to develop increased conduction in tube 26 and thereby develops a voltage across its cathode resistor 27, with a portion of this voltage being effective to control the grid of tube 25 for balancing out the effect on this tube of detecting element 20. Proper adjustment of the bridge circuits allows exact balancing of these effects so that the grid of tube 25 will remain at its predetermined negative bias, which is usually selected at about three or four volts. The less negative this bias voltage is, the more sensitive is the response of the circuitry to incident radiation.

It will be apparent that changes in ambient temperature affect both detecting elements equally and hence are substantially balanced out in the circuit of FIG. 4. The circuitry is not actuated by the presence of journal boxes that are equipped with roller bearings. In such boxes the temperature at the top is not higher than the temperature at the bottom, and therefore even though the box itself has a higher normal temperature of operation, it does not develop the character of unbalance requisite for actuating relay 30.

*Detector Mounting Tubes and Cabinet*

In the application of the present system to the infrared detection of overheated journals, a mounting cabinet and detector mounting tube arrangement such as is shown in FIGS. 5, 6 and 7 has been employed. Detecting element 20 is located in an elongated cylindrical tube designated generally as 32 and detecting element 21 is located in a corresponding mounting tube designated generally as 33. Since it is desirable that the detecting elements collect a maximum of infrared radiation from the regions of the journal box on which they are focused, it is desirable that the mounting tubes have a large aperture, and in the illustrated arrangement each tube is 13½" long and has an O.D. of 3" and a circular aperture that is approximately 2½" in diameter. Incident radiation is brought to a focus by means of a parabolic reflecting mirror 34 set back a distance of approximately 10" from the tube aperture.

The infrared detecting element 20 or 21 for each tube is located at the focal point of its reflecting mirror, and for this purpose is attached to a mounting pad or disc 35 of Lucite or other suitable material which is in turn fixed to a diametral rod 36 located in the mounting tube and carrying a germanium filter 37 in the optical path of the converging rays focused on the detecting element. The germanium filter may be .014" thick and of ¼" diameter. It will be appreciated that this entire mounting assembly, while located in the path of the collected radiation, is of minute size and thus blocks only a minor fraction of the total radiation collected in the pickup tube. The matching infrared element 22 is also preferably mounted on the front side of the diametral rod with a Lucite mounting pad 38 again being employed and with a suitable shield 39 being provided to isolate the matching element from the effects of the collected radiation.

As is apparent from FIG. 5, the optical axes of the pickup tubes diverge at a slight angle which, for a spacing distance from the target of four or five feet, may be on the order of 3° 11' in order to allow the detector element 20 of the upper pickup tube to be focused at the top of the journal box and the detector element 21 of the lower pickup tube to be focused at the bottom of the journal box. This divergent angle arrangement leads to a more compact mounting cabinet.

Each of the 13½"-long pickup tubes 32 and 33 consists of snug-fitting, substantially equal-length inner and outer sleeve assemblies. The inner sleeve assembly consists of a forward heat-insulating section 40 of formica tubing joined in endwise overlapping engagement to a rearward heat conducting section 41 of aluminum tubing. The outer sleeve assembly is of greater wall thickness and also consists of a forward section 42 of formica tubing joined in a similar fashion to a rearward section 43 of aluminum tubing. A cylindrical piston 45 of a heat-insulating material such as formica is slideable in the rear end of the inner aluminum sleeve 41 and is provided with a rearwardly extending threaded rod 45R that projects through a fixed rear wall structure 32R and 33R to cooperate with an adjustable nut 46 for fixing the piston at a position of adjustment in which its parabolic mirror 34 focuses the collected radiation on the detecting element. The mirror is embodied as an insert that is mounted within a suitably shaped pocket at the front of the piston 45. A gold layer is evaporated on the mirror insert 34 and a quartz protective film provided thereover.

For an aperture of 2½" diameter at a distance of 10" from the reflecting mirror, the angle of sight of the detecting element in the pickup tube arrangement would be approximately 30°. To restrict the field of view of each detector element to the confines of the journal box, a collimating lens 47 is located in the pickup tube immediately forwardly of the mounting location of the detecting element. The collimating lens consists of a honeycomb aluminum cylinder 3" in length and 2⅝" in diameter and has partitioning walls 47W .001" thick to minimize attenuation and define collimating passages having a height of ⅛" and a width of ⁵⁄₃₂". The length of the collimating passages and the horizontal and vertical dimensions thereof determine the effective angle of vision and in the case of the present collimating lens, a total angle of approximately 4° in the vertical plane and approximately 60 in the horizontal plane results so that each pickup tube images its detecting element on an area at the journal box of about 5" x 5¼", or 26.25 square inches.

The space at the front end of each pickup tube is filled by a vacuum bottle 48 fixed in air-tight relation therein. This vacuum bottle 48 and the formica piston 45 define an air-tight cylindrical mounting chamber for the reflecting mirror 34 and the infrared detector element 20 to protect these devices from dust and moisture. The vacuum bottle 48 is formed from a quartz tube 48T having a wall thickness of 2 mm., and having its opposite ends sealed by convex polished fused quartz bubbles 48B of one mm. wall thickness. After a perfect vacuum is drawn in each quartz bottle, it is inserted and sealed in the radiation end of its pickup tube.

It will be apparent that the pickup tube arrangement has a simplified and low-cost optical system that comprises a detector element 20 mounted on a skeleton frame 36 of minute size and located approximately at the focal point of an axially adjustable parabolic reflecting mirror 34, with a collimating lens 47 located forwardly of the detector element to restrict its field of view. Advanced materials are available for constructing a meniscus lens for the same purpose, and such materials have markedly reduced attenuation effects, but their costs are almost prohibitive. The vacuum bottle 48 and plastic piston 45 provide thermal isolation of the detector and the one-mm. wall thickness of the quartz bubbles 48B of the vacuum bottle minimizes the problem of attenuation of the infrared radiation that is being collected in the pickup tube.

The mounting cabinet 12 for the dual pickup tubes may be approximately 11" wide, 15" high and 17" long in order to provide adequate space surrounding the tubes for packing with insulating material. A refrigerant conduit 49 from the refrigeration unit 13 of FIG. 1 is shown entering through the bottom of the cabinet for series connection to the separate eight-turn refrigeration coils 50 which are shown wound tightly around the aluminum sleeve section of each pickup tube. The refrigeration unit is selected to maintain the detecting elements at a temperature in the range of minus 20° to minus 40° F. There is a gradual decrease in temperature between the front end and the mirror end of the pickup tube due to the difference in heat conduction through the formica sections, and a heating coil 51 is located around the front quartz bubbles to prevent formation of moisture thereon. The inner aluminum sleeve 41 has a lengthwise slot for the electrical connection wires 52 of the infrared-sensitive elements. These wires are brought through plastic blocks 53 that are removably located in pipes 54 at the rear of each pickup tube to afford access for adjustment of the pistons 45.

In FIG. 8 there is shown an arrangement wherein a single pickup tube 32 of the split beam type mounts both of the infrared detector elements 20 and 21. The surface to be inspected is represented at 60 and it will be assumed that the upper region 61 between the points A and B and the lower region 62 between the points C and D are to be sensed by the detectors 20 and 21, respectively.

Again the surface 60 to be inspected will be assumed to represent the laterally extending rearmost vertical wall of a journal box so that the upper region 61 normally runs somewhat hotter than the lower region 62. It will be understood that the detector elements 20 and 21 may again be connected in a circuit arrangement such as is shown in FIG. 4.

The split beam tube 32 has a mirror 34 arranged with its center of curvature at the point 63 and with its principal focus at the point 64 so that rays emanating from the midpoint M of the surface under inspection are convergent after reflection from the mirror 34 and meet at the principal focus 64.

With reference to the enlarged showing of FIG. 9, the image of point A on the surface under inspection is at point A1. Correspondingly, the images of points B, C and D are at points B1, C1 and D1, respectively. All rays emanating from the surface portion A—B, other than those which pass through the center of curvature 63 and hence return by the same path, are imaged between the points A1 and B1, and this is the location of the infrared detector element 20. Similarly, the detector element 22 is located between the points C1 and D1. Thus, real images of the upper and lower regions of the actual journal box surface exist between the point A1 and B1 and between the points C1 and D1 when the principal axis of the reflecting mirror 34 passes through the center of the surface under inspection. The physical arrangement of the pickup tube 32 may be essentially identical with that shown in FIG. 5 in that the mirror 34 is mounted as an insert at the front end of the piston 45 and in that the front end of the pickup tube is provided with a vacuum bottle 48 and in that the pickup tube may be encircled by a refrigeration coil and mounted centrally within an insulated cabinet. The collimating lens 47, however, is eliminated in order to achieve the proper focusing of the incident rays. In one design of a split beam pickup tube, the length of the tube from the reflecting mirror 34 to the front of the vacuum bottle 48 is approximately 12.5" to allow for a beam spread of approximately 9" at the journal box surface, which is assumed to be spaced 48" from the reflecting mirror.

*Mechanical Shutter*

As is indicated in FIGS. 1, 2 and 3, the mounting cabinet 12 for the pickup tubes has a protective housing 70 next to its front end, and a solenoid-actuated mechanical shutter mechanism under the control of the track circuit of FIG. 1 is located within this housing. The arrangement is such that the mechanical shutters are closed when no trains are present and they are opened only upon the approach and passage of a train. The mechanical shutters serve to protect the glass faces at the front ends of the detector tubes and also serve to keep the infrared sensing tubes in a dark condition when no trains are present.

The details of the shutter mechanism are illustrated in FIG. 10, wherein the shutter housing 70 is shown as including a front wall 70F having a vertically elongated rectangular viewing aperture 70A in registry with the pickup tubes 32 and 33. Cooperating shutter plates 71 and 72 are located behind the viewing aperture 70A and are mounted on roller bearing facilities 71R and 72R, respectively, to undergo simultaneous collinear horizontal opening and closing movement. The housing 70 includes a generally rectangular mounting frame 73 having solenoids 74 and 75 mounted on its upper horizontal cross piece 73U and oriented for horizontal shifting movement of their armatures 74A and 75A, respectively. Armature 74A is connected to a lever 76 which is pivoted to the frame at the point 76P and which has its other end slotted for loose sliding pivotal engagement on a pin 71P of shutter plate 71. Similarly a lever 77 has its upper end pivotally connected to armature 75A and is pivoted intermediately on the frame 73 and has its lower end slotted for loose sliding pivotal engagement on a pin 72P of shutter plate 72.

In FIG. 10, the parts are illustrated in their closed position, and this is the position in which they are held so long as the track relay TR of FIG. 1 is energized. When a train approaches and enters the track circuit to deenergize the track relay TR, the solenoids are actuated to swing the shutter plates in opposite horizontal directions for unblocking the viewing aperture 70A in the front wall 70F of the shutter housing. The shutter plates are preferably arranged so that each covers half of each detector element's field of view. This balanced control of the shutter plates over the detector elements prevents the opening action of the shutter from developing a false operation resulting from an accidental unbalance of the detectors. Of course, where the shutter is used in a system that includes a device such as the proximity contactor 15 that is keyed to control gating circuits for each journal box, this possibility of false operation is eliminated. However, in applications that do not include such gating arrangements, the shutter has the advantage of a balanced opening action.

*Summary of Operation*

Under normal conditions, when no train is present the shutter plates 71 and 72 in the shutter housing 70 at the front end of the mounting cabinet 12 are closed to block off the pickup tubes 32 and 33 and maintain their detector elements 20 and 21, respectively, in a dark state. At this time, relay contact 15C in the circuit of FIG. 4 is open to disable the output circuit of amplifier tube 25, which is controlled by the balanced bridge circuit connection of the detector elements 20 and 21.

As a train approaches the detector station 10 of FIG. 1 and enters onto the stretch protected by the track circuit moving from right to left, the track relay TR is deenergized to cause operation of solenoids 74 and 75 for opening the shutter plates and exposing the detector elements 20 and 21 to incident radiation. The shutter plates open in a balanced fashion to avoid disturbing the balanced relationship between the bridge circuits that contain the infrared detector elements 20 and 21.

As the first journal box of the train moves across the field of view of the detector elements 20 and 21, the wheel-sensing unit 15 operates to close contact 15C and enable the output circuit of the detector elements for the instant that these elements image upon upper and lower regions of the rearmost lateral wall of the journal box.

If this box is operating at normal efficiency, a temperature differential on the order of 20° F. in favor of the upper region will be detected, but the bridge circuits are biased to balance out the effects of a temperature differential of this order of magnitude. If the journal box is overheating, the temperature differential becomes great enough to cause the output circuit comprising transistors 28 and 29 to actuate relay 30 for closing the utilization circuit 31, which may control a paint spray device 17 (FIG. 1) and which may also control a wayside signal 16 located a mile or two down the track. Each overheated box on the train will operate the paint spray unit 17, and upon stopping of the train, personnel may readily check the boxes for paint markings.

The effects of reflected sunlight and the effects of ambient temperature are substantially equal upon both detector 20 and detector 21, and the circuit connection of these detector elements balances out these effects. In addition, the higher operating temperatures of roller bearing equipped journal boxes create a different temperature differential pattern that is incapable of actuating the output circuit.

Thus, the infrared detection system of this invention provides a low-cost, reliable approach to the infrared detection of overheated journal boxes. The system is substantially free of false indications resulting from sun reflection, ambient temperature changes, and any other extraneous factors which tend to affect both infrared detection elements correspondingly.

The detector mounting tube's optical arrangement achieves good response sensitivity at low cost, and the refrigeration and insulation system assures uniformity of performance over a wide range of ambient temperature conditions.

The foregoing description and the drawings are given merely to explain and illustrate the invention and the manner in which it may be performed, and the invention is not to be limited thereto except insofar as the appended claims are so limited, since those skilled in the art who have this disclosure before them will be able to make modifications and variations therein without departing from the scope and spirit of the invention.

I claim:

1. A hot journal detection system comprising first and second heat-sensitive means for mounting adjacent track rails traversed by railroad cars supported on axles rotatably mounted in journal boxes projecting laterally from opposite sides of the car, each of said heat-sensitive means having means producing an electrical signal in response to incident radiant energy, optical means for imaging said first and second heat-sensitive means on upper and lower regions, respectively, of each passing journal box, means for combining the electrical signals developed by heat radiation on said heat-sensitive means to neutralize the signal differential due to the temperature differential of journal boxes operating at normal efficiency and to balance out the effects of sunlight and ambient temperature and including means responsive to the increased signal differential resulting from overheated journal boxes, and utilization means responsive to said last-named means.

2. The method of detecting a hot journal box on a railroad car comprising producing electrical signals individually representative of heat radiation from vertically spaced exterior regions on a journal box, combining said signals in opposition to produce a resultant actuating signal only when the heat radiation from the upper region on the box exceeds the heat radiation from the lower region on the box by more than a predetermined normal differential, and utilizing the actuating signal to indicate the presence of an overheated journal.

3. The method of detecting a hot journal box on a moving train comprising momentarily imaging separate heat-sensitive detectors on vertically spaced exterior image regions of each of its successive journal boxes, simultaneously producing electrical signals individually representative of the response of each detector to incident radiation from its corresponding image region on a journal box, combining said signals in opposition to produce a resultant actuating signal when the heat radiation from the upper image region that is incident upon one detector exceeds the heat radiation from the lower image region that is incident upon the other detector by more than a predetermined differential, and utilizing the actuating signal to indicate the presence of an overheated journal.

4. A hot journal detection system for application alongside track rails traversed by railroad cars supported on axles rotatably mounted in journal boxes projecting laterally on opposite sides of the car, an electric circuit having first and second infrared-sensitive circuit elements connected therein to act in balanced opposition, optical means for separately imaging vertically spaced surface regions of a journal box on said circuit elements to produce a differential response thereof in said circuit in accordance with the energy differential between the incident radiation from said regions, and utilization means for indicating an overheated journal box and responsive to the differential response produced in said circuit when the temperature differential between said regions exceeds a predetermined acceptable range.

5. A hot journal detection system for application alongside track rails traversed by railroad cars supported on axles rotatably mounted in journal boxes projecting laterally on opposite sides of the car, an electric circuit having first and second infrared-sensitive circuit elements connected therein to act in balanced opposition, optical means for separately imaging vertically spaced exterior surface regions on a laterally extending vertical wall of a journal box on said circuit elements to produce a differential response thereof in said circuit in accordance with the energy differential between the incident radiation from said regions, and utilization means for indicating an overheated journal box and responsive to the differential response produced in said circuit when the temperature at the upper region of a journal box exceeds that at the lower region by more than a predetermined acceptable range.

6. A hot journal detection system for application alongside track rails traversed by railroad cars supported on axles rotatably mounted in journal boxes having solid bearings riding on said axles, an electric circuit having first and second infrared-sensitive detection means connected in balanced opposition for producing an electrical response therein, optical means for separately imaging upper and lower regions of a journal box on said first and second detection means, respectively, to produce a differential response thereof in said circuit in accordance with the energy differential between the radiation from said regions, utilization means for indicating an overheated journal condition and responsive to the differential response occurring in said circuit when the temperature at the upper region of a journal box exceeds that at the lower region by more than a predetermined acceptable range, a switch in the output of said electric circuit for disconnecting said utilization means from the differential response induced in said circuit by said detection means, and means alongside a track rail for responding momentarily when a journal box moves through the location that is imaged on said detection means, said last-named means being connected to actuate said switch.

7. A hot journal detection system for application alongside track rails traversed by railroad cars supported on axles rotatably mounted in journal boxes having solid bearings riding on said axles, an electric circuit having two separate infrared-sensitive detection elements connected in balanced opposition for producing an electrical response therein, optical means for separately imaging upper and lower regions on a laterally extending vertical wall of a journal box on said detection means to produce a differential response thereof in said circuit in accordance with the energy differential between the radiation from said regions, said optical means comprising an elongated hollow split beam tube having a forwardly facing reflector adjacent its rear end, said reflector having its center of curvature forwardly of its principal focus and jointly therewith defining a line that intersects a point midway between said regions such that rays emanating from said point are convergent after reflection from said reflector and meet at said principal focus and such that rays emanating from said two distinct regions are imaged at locations on opposite sides of said line and means for mounting said elements at said locations within said tube such that one element is subjected only to infrared energy from one of said regions and the other element is subjected only to infrared energy from the other region, and utilization means for indicating an overheated journal condition and responsive to the differential response occurring in said circuit when the temperature at the upper region of a journal box exceeds that at the lower region by more than a predetermined acceptable range.

References Cited in the file of this patent

UNITED STATES PATENTS

| | | |
|---|---|---|
| 2,562,864 | Jury et al. | July 31, 1951 |
| 2,710,559 | Heitmuller et al. | June 14, 1955 |
| 2,800,023 | Obermaier | July 23, 1957 |
| 2,856,540 | Warshaw | Oct. 14, 1958 |
| 2,880,309 | Gallagher et al. | Mar. 31, 1959 |
| 2,963,575 | Pelino et al. | Dec. 6, 1960 |